April 14, 1942. H. J. FINDLEY 2,279,369
FRESH AIR INTAKE DEVICE
Filed June 22, 1938 6 Sheets-Sheet 1

INVENTOR.
HOWARD J. FINDLEY
BY
Kwis Hudson & Kent
ATTORNEYS

April 14, 1942.   H. J. FINDLEY   2,279,369
FRESH AIR INTAKE DEVICE
Filed June 22, 1938   6 Sheets-Sheet 4

INVENTOR.
HOWARD J. FINDLEY
BY Kwis Hudson & Kent
ATTORNEYS

April 14, 1942.  H. J. FINDLEY  2,279,369
FRESH AIR INTAKE DEVICE
Filed June 22, 1938  6 Sheets-Sheet 5

INVENTOR.
HOWARD J. FINDLEY
BY
ATTORNEYS

April 14, 1942.  H. J. FINDLEY  2,279,369
FRESH AIR INTAKE DEVICE
Filed June 22, 1938  6 Sheets-Sheet 6

INVENTOR.
HOWARD J. FINDLEY
BY *Kwis Hudson & Kent*
ATTORNEYS

Patented Apr. 14, 1942

2,279,369

UNITED STATES PATENT OFFICE 2,279,369

FRESH AIR INTAKE DEVICE

Howard J. Findley, Euclid, Ohio, assignor to Eaton Manufacturing Company, Cleveland, Ohio, a corporation of Ohio Application June 22, 1938, Serial No. 215,201

12 Claims. (Cl. 98—2)

This invention relates to fresh air intake devices for automobiles and other vehicles, and more particularly to devices of this type embodying means by which the delivery of fresh air into the vehicle compartment, or to a desired point thereof, can be readily controlled.

An object of my invention is to provide an improved device for use on a vehicle for taking in fresh air and by which the delivery of fresh air directly into the vehicle, or to a conditioning device therein, can be readily controlled by the driver.

Another object of my invention is to provide an adaptor device which can be readily applied to the usual cowl ventilator of existing vehicles and which is movable to different positions for controlling the air intake through such cowl ventilator.

A further object of my invention is to provide improved air intake means of the type having an air scoop or the equivalent, and in which an air intake box having a discharge connection leading therefrom is arranged for movement relative to the air intake opening for controlling the delivery of air therethrough into the vehicle.

Still another object of my invention is to provide an improved air intake means, of the type referred to, in which the intake box has a top opening of a size and shape corresponding substantially with the intake opening and is movable to cause the rim of the box to engage or disengage the rim of the intake opening.

My invention also aims to provide an improved fresh air intake means of the type having a movable box, and in which novel means is provided for mounting and actuating the box.

Yet another object of my invention is to provide an improved cowl ventilator having an intake opening, and in which a lid and deflector member disposed outwardly of the opening and an air intake box disposed inwardly of the opening are movable to different positions for controlling the delivery of air through the intake opening.

My invention further contemplates an improved cowl ventilator of the type just mentioned, in which provision is made for relative movement between the box and the lid and deflector member.

My invention may be further briefly summarized as consisting in certain novel combinations and arrangement of parts hereinafter described and particularly set out in the appended claims.

In the accompanying sheets of drawings—

Further and more detailed reference will now be made to the accompanying drawings for the purpose of describing several embodiments of my fresh air intake device. However, before proceeding with such detailed description it should be understood that the invention is not to be regarded as limited to the particular forms herein disclosed, but may be embodied in various other air intake devices and arrangements.

Figure 1:
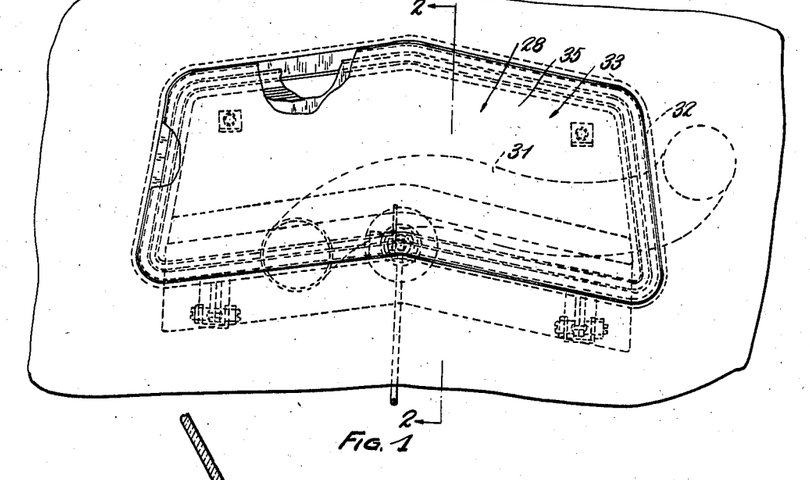
Fig. 1 is a top plan view, with portions broken away, showing my improved fresh air intake device embodied in a cowl ventilator.
Figures 2, 3, 4:
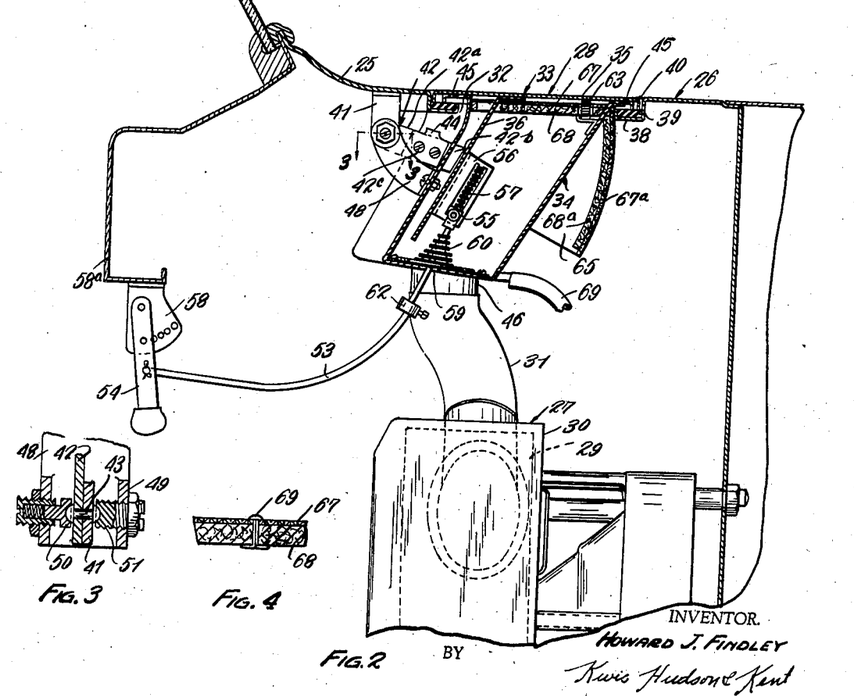
Fig. 2 is a vertical sectional view taken through the cowl ventilator and adjacent vehicle structure, as indicated by line 2—2 of Fig. 1.
Fig. 3 is a partial sectional view taken as indicated by line 3—3 of Fig. 2 and showing the construction of the hinge mounting.
Fig. 4 is a partial sectional view taken through a filter and insect screen and showing one way of mounting the filter on the screen.
Figures 5, 9, 10:
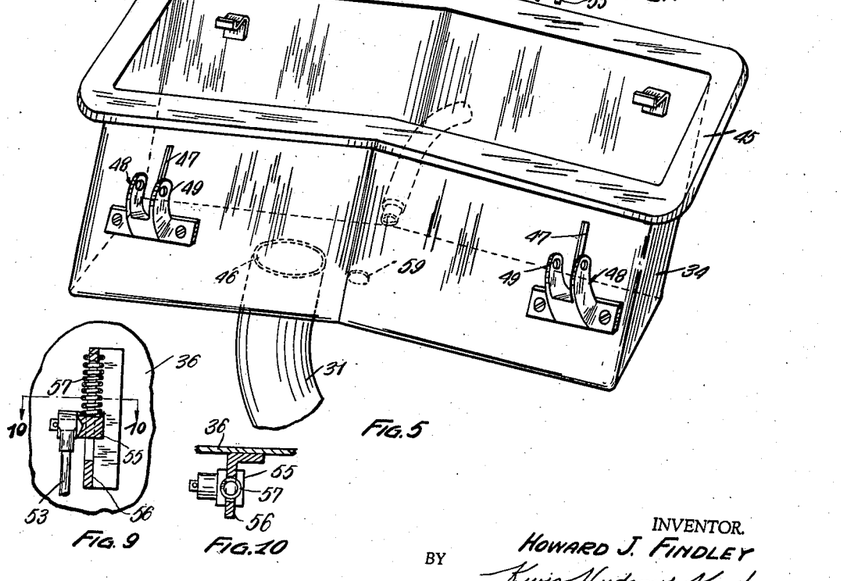
Fig. 5 is a perspective view showing the air intake box in detached relation.
Fig. 9 is a partial vertical sectional view taken through the actuating means for the lid and deflector member.
Fig. 10 is a transverse sectional view thereof taken on line 10—10 of Fig. 9.

Figs. 1 and 2 of the drawings illustrate one embodiment of my fresh air intake device, and although the device as here shown is applied to the cowl 25 of the automobile 26, it should be understood that the device may be applied to other vehicles and to portions of the vehicle body other than the cowl. My fresh air intake device is especially suitable for use on vehicles which have an air heating or conditioning device 27 in the passenger compartment thereof. The device 27 may be an air conditioning device of any satisfactory form which is adapted to heat or condition fresh air brought in from outside the vehicle and which may or may not recirculate and condition the air already in the vehicle compartment, or may be a device in which the conditioned air being delivered is partly fresh air and partly recirculated air. The device 27 shown in this instance is an air conditioning heater of the construction disclosed in Patent No. 2,116,145 issued May 3, 1938. This particular form of heater has a heat exchange core 29 and a shell 30 disposed around the core to form a plenum chamber to which the fresh air to be heated is supplied through the flexible conduit 31.

The fresh air intake device 28 may be associated with an opening 32 of the cowl 25, and may comprise a combined lid and deflector member 33 and an air intake box 34. Many of the automobiles being manufactured or used at the present time are provided with a cowl opening corresponding with the opening 32 and a combined lid and deflector member corresponding with the member 33, and when my invention is to be applied to vehicles so equipped, I construct the box 34 as an accessory device which can be readily applied to the existing structure. However, my invention is not limited in scope to an accessory device to be installed in existing vehicles because an air intake box in combination with a lid and deflector member, as herein disclosed, can also be incorporated in vehicles as a part of their original construction and equipment.

The cowl opening 32 may have any desired shape or outline, such as the laterally elongated somewhat rectangular shape shown in Fig. 2. The member 33 may comprise a lid portion 35 which is disposed above or outwardly of the intake opening 32 and a deflector portion 36 which supports the lid portion and extends into the intake opening. Both the lid portion and the deflector portion may be formed as sheet metal stampings and may be laterally elongated to correspond with the lateral elongation of the intake opening 32. The deflector portion 36 preferably extends in angular relation to the lid portion 35 so that when the lid is elevated above the cowl, the lid and deflector portions form an air scoop which, during the forward motion of the vehicle, causes a stream of fresh air to be directed or delivered downwardly into the vehicle through the opening 32. The foregoing description of the construction and arrangement of the member 33 is more or less typical although in different makes of vehicles, similar members of specifically different shapes and constructions may be encountered.

The portion of the cowl surrounding the opening 32 may be deflected to form a channel or rim 38 in which is seated a resilient gasket 39 formed of sponge rubber or other suitable material. The lid portion 35 may be provided around its outer edge with an inturned flange 40 adapted to engage the gasket 39 when the lid is in its closed or lowered position, that is to say, in a position with its top substantially flush with the top of the cowl.

Figures 6, 7, 8:
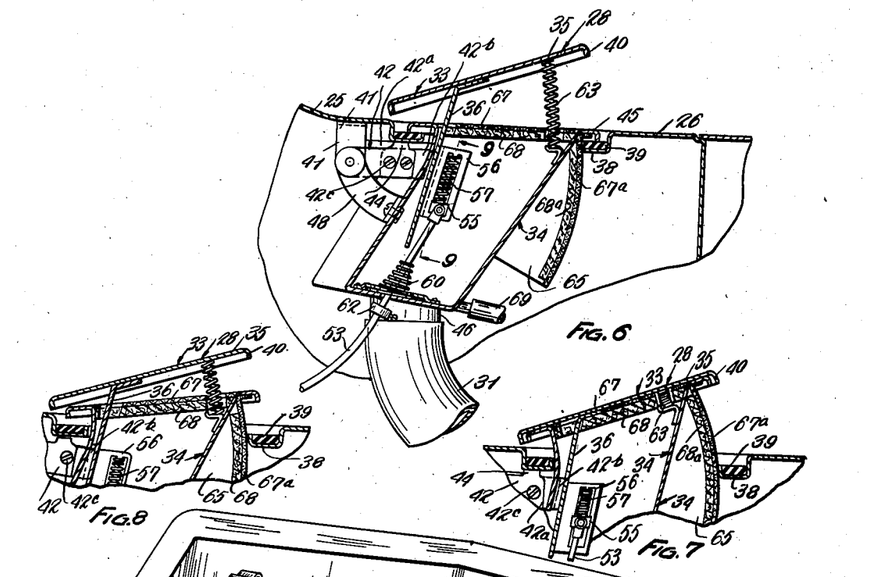
Fig. 6 is a partial vertical sectional view similar to that of Fig. 2, but showing the ventilator lid in open position and serving to direct air into the box.
Fig. 7 is another partial vertical sectional view taken through the device and showing the box in lifted position to cause air to be delivered directly into the vehicle compartment.
Fig. 8 is another partial vertical sectional view showing an intermediate position for the box in which fresh air is delivered into the box and also directly into the vehicle compartment.

As is usual in present-day vehicle body construction, the member or scoop 33 may be mounted for swinging movement whereby this member can be moved to the desired different positions relative to the intake opening 32. For this purpose a pair of laterally spaced brackets 41 may be mounted on the underside of the cowl 25 and correspondingly spaced arms 42 may be connected to the deflector portion 36 and hinged to the brackets. To facilitate the mounting of the member 33 on the vehicle body and the construction of the hinge for this member it is usual practice to construct the hinge arms 42 of two sections 42a and 42b which are bolted together by bolts 42c when the member is installed in the cowl opening. The arm sections 42a may be hinged to the brackets 41 by means of rivets 43 and the arm sections 42b may be connected to the deflector portion 36 by spot welding or other means. If desired, the arms 42 may be provided with stops 44 which engage the rim 38 of the cowl opening 32 for limiting the outward movement of the lid and deflector member 33. Fig. 7 of the drawings shows the member 33 in its extreme upper position with the stops 44 in engagement with the rim 38.

The air intake box 34 may comprise a hollow sheet metal structure formed of one or more stampings, or may be of any other suitable construction. This box is laterally elongated to correspond with the opening 32 of the cowl, and although it may be variously arranged relative to the opening, in this instance it is of such size and shape that it can be shifted in the cowl opening so as to project part way therefrom. In all of its various forms the box has a main opening, preferably at the top thereof, and in this instance is provided with an outwardly projecting lateral flange or rim 45, which overhangs the rim 38 of the cowl opening. The box can be inserted into the cowl opening from a position thereabove, after disconnecting the bolts 42c and removing the member 33, and when the box extends inwardly through the cowl opening, as shown in Fig. 2, it forms a closure for this opening. As shown in the drawings, the box 34 has side, end and bottom walls defining a recess or chamber of substantial depth, and one of the walls, preferably the bottom wall, has a discharge connection 46 leading from the box and with which the flexible conduit 31 may be connected for conducting fresh air to the heater 27 or other desired point of the vehicle. Laterally spaced slots 47 provided in the rear wall of the box accommodate the hinge arms 42 of the member 33.

The box 34 is movable to different positions for controlling the intake of air through the cowl ventilator and a movable mounting of the box for this purpose may be accomplished in various ways. In this instance I show the box 34 mounted to swing upon the same hinge means as the lid and deflector member 33 but adapted to movement relative to such member. This may be accomplished by providing the box with a pair of laterally spaced arms 48 having one end thereof connected with the rear wall of the box and at the other end having a forked portion 49 adapted to be mounted on the hinge pin, bolt or rivet 43 about which the member 33 swings. For convenience in mounting the arms 48 on the rivets 43, I may provide the forked ends 49 with a recessed spring-pressed plunger 50 and a hollow-pointed screw 51 aligned therewith. The plunger and screw engage the heads of the rivets, as shown in Fig. 3, and thus provide an attaching means by which the box 34 can be quickly mounted in a position to swing about the same pivot axis as the lid and deflector member 33.

Figure 20:
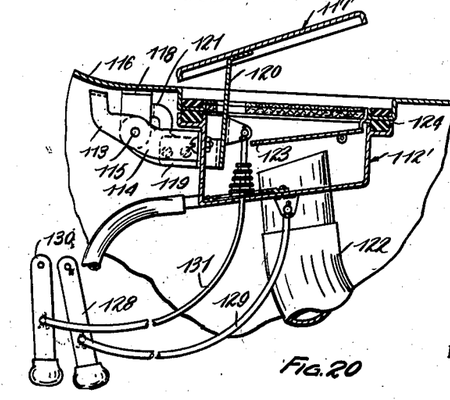
Fig. 20 is a vertical sectional view taken through a fresh air intake device or cowl ventilator similar to that of Fig. 17 but in which separate operating members are provided for the lid and box.

For moving the lid member 33 and the box 34 to different positions to thereby control the intake of fresh air through the cowl opening 32, any suitable form of actuating means may be provided whereby this result can be conveniently accomplished by the operator of the vehicle. In the arrangement of Fig. 2 I employ a single actuating means which is common to the lid member and box and permits relative movement therebetween although, if desired, separate actuating members may be provided for the lid and box as shown in Fig. 20. This common actuating means may comprise a resiliently flexible rod or link 53 capable of transmitting pushing and pulling forces and having one end thereof connected with an actuating lever 54 and its other end connected to the lid member 33. For a purpose to be presently explained the connection between the rod 53 and the lid member 33 may be a yieldable one formed by connecting the rod to a block or spring seat 55 which is slidable in a bracket 56 against the opposition of the compression spring 57. The lever 54 may be pivoted to a bracket or quadrant 58 which is mounted on the instrument panel 58a so that a pushing force applied to the lever will be transmitted through the rod 53 and will apply a lifting force to the lid member 33 and a pulling force applied to the lever will cause a lowering force to act on the lid member. A hole 59 provided in the bottom of the box 34 accommodates the rod 53 and a boot or hollow flexible packing 60 applied to the rod at this point prevents leakage of air out of the box through the hole.

Movement may be imparted to the box 34 from the rod 53 by a collar 62 which may be located on the rod at a point spaced from the block 55. The collar 62 will engage the bottom of the box when the lid member 33 has been either partially or fully opened, depending upon the setting of the collar, and will thereafter cause upward swinging movement of the box. To prevent the box from being lifted simultaneously with the initial opening movement of the lid member 33, I may provide coiled compression springs 63 between the lid and box as shown in the drawings.

When the operator wishes to supply fresh air to the heater 27, he pushes on the lever 54 and thereby causes the lid member 33 to be swung open to the position shown in Fig. 6 and during the initial opening movement of the lid member the compression springs 63 hold the box 34 in its lower position with its flange or rim 45 seated against the packing 39. With the lid member and box in the relative positions shown in Fig. 6, the lid member will act as an air scoop during the forward motion of the vehicle and will cause fresh air to be deflected downwardly into the box. Since the rim of the box is seated against the packing 39, air will not pass directly into the vehicle compartment, but will be forced into the box and thence through the discharge connection 46 and the conduit 31 to the heater 27.

If the operator does not desire heated fresh air, but wishes to admit fresh air directly into the vehicle compartment, he imparts a further pushing movement to the lever 54 which will cause the box 34 to be lifted or swung upwardly in the opening 32 by engagement of the collar 62 against the bottom of the box. By this further actuation of the lever 54 the upper end of the box 34 is brought into engagement with the underside of the lid member 33, as shown in Fig. 7, in which position the lid member closes the top of the box and prevents any fresh air from entering the latter. While the box is in this lifted or elevated position its forward wall is spaced from the forward edge of the cowl opening 32 to provide an air passage 65 which leads directly into the vehicle compartment. At this time the box 34 also cooperates with the lid member 33 in forming a scoop or deflecting means which causes fresh air to be forced downwardly through the passage 65 and directly into the vehicle compartment during the forward vehicle movement.

During certain weather conditions the operator may not wish to cut off the entire supply of fresh air to the heater, but may prefer to have a portion of the fresh air delivered through the heater and the remainder delivered directly into the vehicle compartment. To secure this effect he pushes the lever 54 only far enough to lift the box 34 to an intermediate position, as shown in Fig. 8. When the lid member 33 and the box 34 occupy substantially the relative positions shown in Fig. 8, some of the fresh air will be forced into the box and through the conduit 31 to the heater. At the same time, fresh air will be forced directly into the vehicle compartment through the passage 65.

The above described yielding connection between the rod 53 and the lid member 33 permits the box 34 to be lifted to its fully or partially opened positions of Figs. 7 and 8 after the lid member has been moved to its open position. During this movement of the box the block 55 slides in the slot of the bracket 56 compressing the spring 57 and thereby permitting an overtravel of the actuating rod 53.

To prevent insects and other foreign particles from entering the cowl ventilator with the fresh air supply I may provide a screen 67 which is mounted on the box 34 to extend across the open top thereof. In addition to the screen 67 I may provide a filtering element 68 for removing dust and other smaller foreign particles from the intake air. This filtering element may be in the form of a layer or slab of fibrous material which is disposed against the screen 67 and is connected therewith by means of staples or split rivets 69, as shown in Fig. 4. The screen and filter elements 67 and 68 remove insects and foreign particles from the fresh air which is supplied to the heater and, if desired, similar screen and filter elements 67a and 68a may be mounted on the forward portion of the rim of the box to extend downwardly across the passage 65.

During some conditions of operation, rain may enter the box 34 with the fresh air supply, and to prevent an accumulation of moisture in the box, I may provide a suitable drain connection 69 leading from a point adjacent the bottom thereof.

Figures 11, 12, 13, 14, 15, 16:
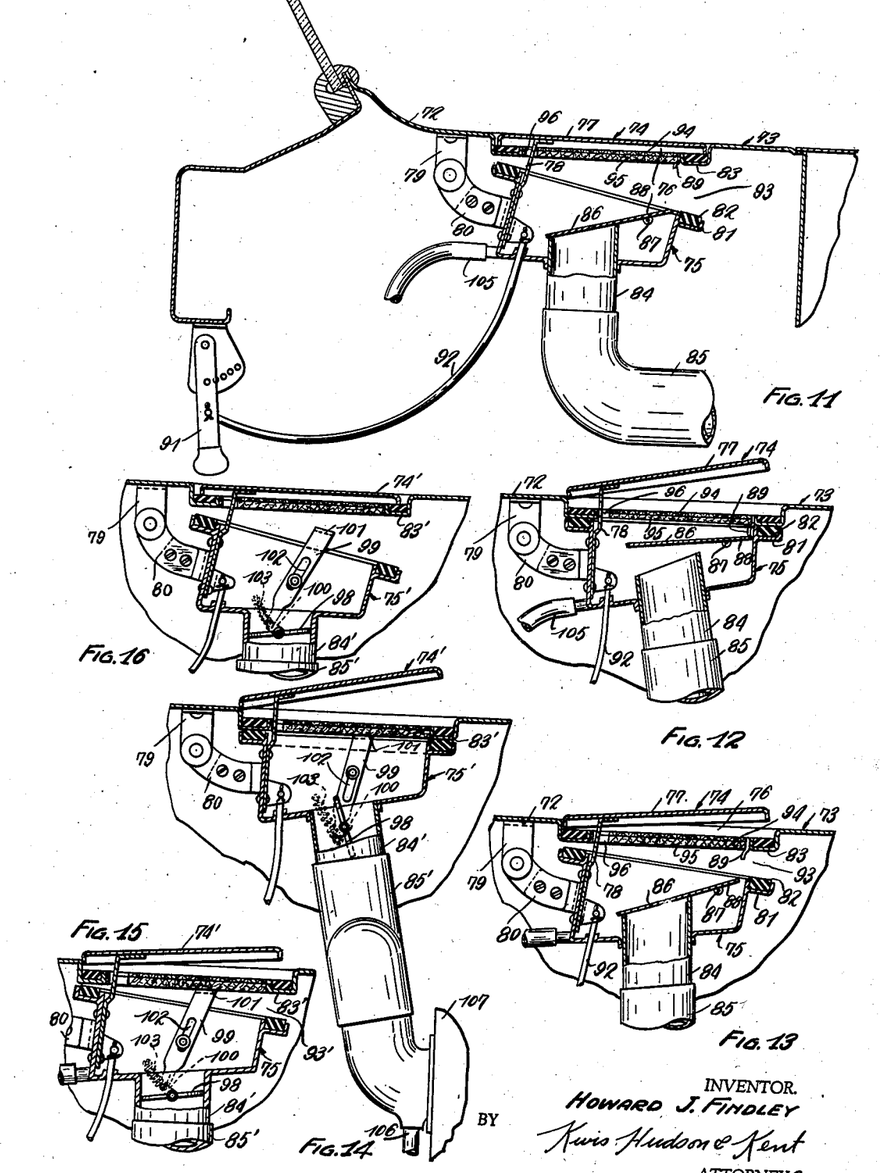
Fig. 11 is a vertical sectional view similar to that of Fig. 2, but taken through another fresh air intake device of my invention.
Fig. 12 is another vertical sectional view thereof, but showing the lid and deflector member in open position and the rim of the box engaging the rim of the intake opening.
Fig. 13 is a similar vertical sectional view, but showing an intermediate position for the box and lid.
Fig. 14 is a vertical sectional view taken through a fresh air intake device similar to that of Fig. 11, but embodying a different form of valve.
Fig. 15 is a vertical sectional view showing the device of Fig. 14 with the lid and box in an intermediate position.
Fig. 16 is a similar view but showing the lid closed and the box in its lowermost position.

In Fig. 11 I show another embodiment of my fresh air intake device which may also be applied to the cowl 72 of a vehicle 73. This fresh air intake device also comprises a lid member 74 and an intake box 75 which cooperate with an opening 76 of the cowl for controlling the intake of fresh air therethrough. The lid member 74 may comprise connected cover and deflector portions 77 and 78 and may be mounted for swinging movement in a pair of laterally spaced cowl brackets 79 by means of a pair of correspondingly spaced hinge arms 80. In this form of my device, the box 75 is also arranged to swing in the brackets 79, preferably by being mounted on the deflector portion 78 of the lid member and connected therewith by screws or rivets. The lid member and box are connected with each other to extend in angular or relatively diverging relation so that swinging of the lid member toward the cowl opening causes swinging of the box away from the cowl opening, and vice versa.

The box 75 is generally similar to the box 34 above described in that it is of sheet metal construction having side, end and bottom walls and an opening at the top thereof corresponding substantially in size and shape with the opening 76 of the cowl. This box also has a rim or flange 81 around the top thereof providing a seat for a resilient gasket 82 which is adapted to engage the underside of the rim 83 of the cowl opening when the box is in its upper or closed position. The box 75 also has a discharge connection 84 extending therefrom, preferably through the bottom wall, with which a flexible conduit 85 may be connected for supplying fresh air to a heater or other point of the vehicle, but instead of the discharge connection being normally open, as in the box 34 of Fig. 2, it is controlled by a valve 86. This valve may be disposed in the box 75 and may be mounted on a pivot 87 which is located relative to the connection 84 such that the valve will tend to seat against the latter under the action of gravity. The valve has a lug or arm portion 88 projecting on the opposite side of the pivot 87 and which is adapted to be engaged by some portion of the cowl structure, such as the finger 89, for automatically opening the valve when the box is moved to its upper or closed position, as shown in Fig. 12.

When fresh air is to be supplied through the conduit 85 to the heater or other desired point of use, the operator pushes on the actuating lever 91 to thereby cause a lifting force to be transmitted through the flexible rod 92 to the lid member 74, and likewise, to the box 75 which is permanently connected therewith. In this way the box and lid are moved to the setting shown in Fig. 12 in which the rim of the box is seated against the rim of the cowl opening and the lid member 74 forms a scoop or deflecting means for directing air into the box during the forward motion of the vehicle. In this position of the box the valve 86 is held in its open or lifted position by the engagement of the valve projection 88 with the finger 89 so that fresh air forced into the box will be delivered through the connection 84 and the conduit 85.

If the operator wishes to admit fresh air directly to the vehicle compartment without passage through the heater, he operates the lever 91 to set the box 75 and the lid member 74 at an intermediate position as shown in Fig. 13. In this setting the lid member 74 is in a partially open position and functions as a scoop for forcing air through the cowl opening 76. Likewise, for this intermediate setting the rim of the box 75 is spaced from the rim 83 of the cowl opening providing a passage 93 therebetween which leads directly into the vehicle compartment. Since the box 75 is spaced from the cowl structure while in this intermediate setting, the valve arm 88 will be disengaged from the finger 89 and the valve 86 will be in its closed position seating against the connection 84 to prevent the delivery of air to the heater.

This form of my fresh air intake device may also be provided with screen and filter elements 94 and 95 of a construction similar to that above described, but which are arranged to extend across the cowl opening with the edges of the screen connected to the rim 83 of the cowl opening. A laterally elongated slot 96 provided in the screen and filtering elements accommodates the deflector portion 78 on the lid member.

Various valve arrangements may be provided for controlling the discharge connection leading from the box of my fresh air intake device, the arrangement above described for the valve 86 being one of these arrangements. In Figs. 14, 15 and 16 I show a fresh air intake device which is identical with that of Fig. 11 except that it is provided with a different valve arrangement for controlling the discharge connection leading from the box. As shown in Fig. 16, this second form of valve arrangement may comprise a butterfly valve 98 located in the discharge connection 84', and a push rod or lever 99 having the lower end thereof connected with an arm or lever 100 of the valve for actuating the latter. The upper end of the rod 99 may have a laterally disposed flange or lug 101 which engages the rim 83' of the cowl opening while the box is being lifted to its upper or closed position. The rod 99 may be mounted for relative movement on an end wall of the box as by means of the pin and slot connection 102. A tension spring 103 may be arranged to act on the valve arm 100 to normally hold the valve in its closed position.

Figs. 14 and 15 illustrate the operation of this valve arrangement and from these views it will be seen that while the box 75' is being lifted to thereby engage the same with the rim of the cowl opening and shift the lid member 74' to its elevated position, the valve 98 will be opened and held open by the push rod 99 so that air forced into the box will be delivered through the connection 84' and the conduit 85' to the heater or other desired point of use. Fig. 15 shows the lid member and the box set at their intermediate positions in which the lid member is partially open and the box is spaced from the rim of the cowl opening to admit air directly to the vehicle compartment through the passage or space 93'. For this intermediate setting of the box and lid member the valve 98 is preferably in closed position to prevent air from being delivered through the conduit 85'.

In Fig. 11 I have shown a drain connection 105 which may be provided for removing collected moisture from the box 75. However, instead of or in addition to employing a drain connection leading from the box as shown in Fig. 11 and also in Fig. 2, I may provide a drain connection 106 at some appropriate point of the discharge connection leading from the box, for example, at a point adjacent the heater 107.

Figure 17:
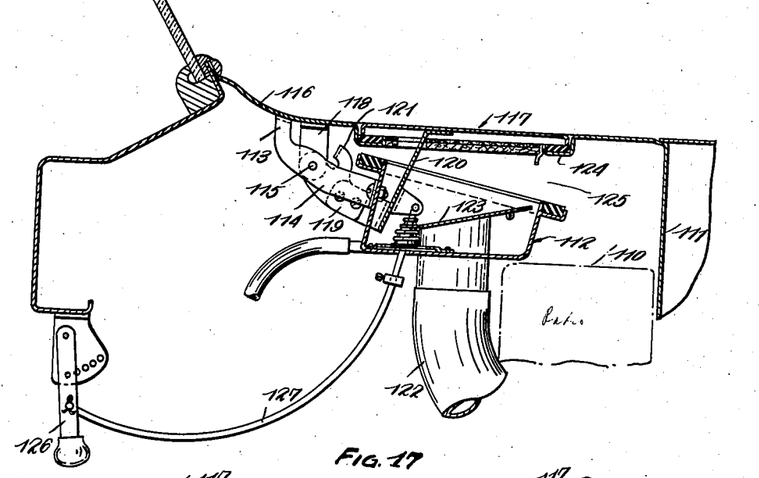
Fig. 17 is a vertical sectional view taken through another fresh air intake device of my invention which embodies stops for locating the lid and box in the desired positions.

In certain vehicles in which my improved fresh air intake device may be used, a radio 110 or other device may be mounted on the dash 111, as shown in Fig. 17, in such position that the air intake box 112 would strike thereagainst if the box were permitted to drop to its lowest position. To avoid such an interference which might otherwise cause damage to the radio, I provide means for limiting the downward swinging movement of the box 112. This limiting means may be in the form of stops 113 formed on the box-supporting hinge arms 114 so as to project beyond the pivot axis 115 and engage the underside of the cowl 116.

Figure 18:
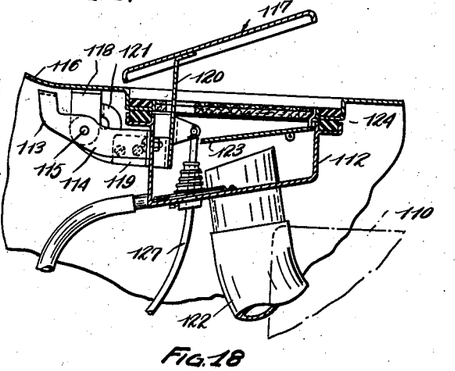
Fig. 18 is a vertical sectional view taken through the device showing the lid in open position and the box in engagement with the rim of the intake opening.
Figure 19:
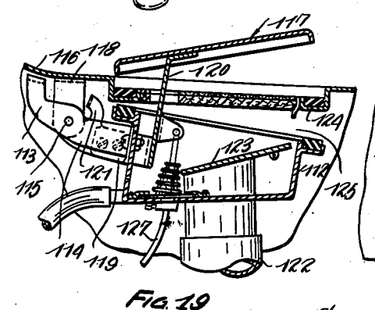
Fig. 19 is a similar vertical sectional view showing the device with the lid and box in an intermediate position.

In the form of my device here shown the box 112 and the lid member 117 are both mounted in the spaced brackets 118 and swing about the same pivot axis 115. The lid member 117 is mounted in the brackets 118 by means of arms 119 which are connected with the deflector portion 120 and have stops 121 thereon which are engageable with the brackets for limiting the upward movement of the lid member. Figs. 18 and 19 illustrate other positions for the box 112 and the lid member 117, Fig. 18 showing the box and lid member in their uppermost positions in which fresh air is forced into the box and is delivered through the discharge connection 122 while the valve 123 is held open. Fig. 19 shows the box and lid member in their intermediate positions in which the valve 123 is closed and the rim of the box is spaced from the rim 124 of the cowl opening to provide a space or passage 125 through which the fresh air is delivered directly into the vehicle compartment.

In Fig. 17 I show a lever 126 and a flexible rod 127 as forming a common actuating means for the box 112 and the lid member 117. However, instead of providing such a single actuating means for both the box and the lid member, I may provide individual actuating means for the box and lid member as shown in Fig. 20. In this arrangement a lever 128 may be connected with the box 112' by a flexible rod 129 and another lever 130 may be connected with the lid member 117' by means of the flexible rod 131. By manipulating the two levers, 128 and 130, the operator can move the box 112 and the lid member 117 to their upper, lower or intermediate positions as may be desired.

Figure 21:
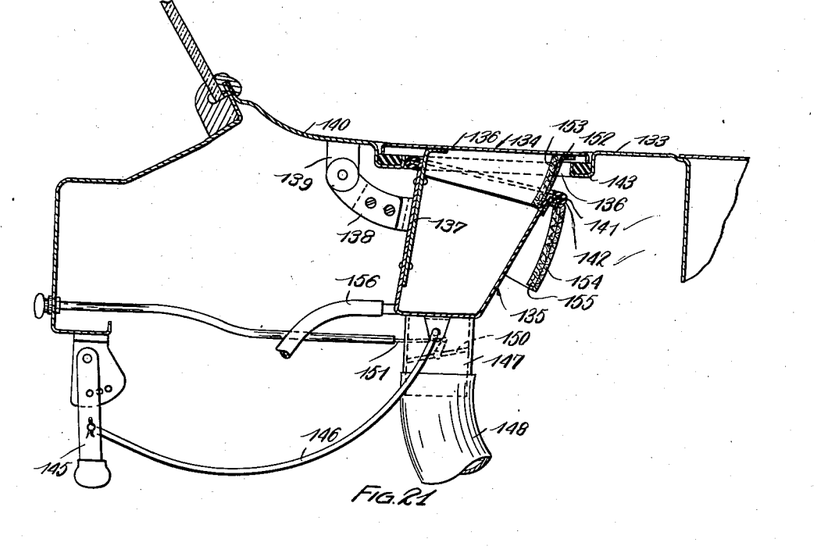
Fig. 21 is a vertical sectional view showing still another fresh air intake device or cowl ventilator of my invention.

In Fig. 21 of the drawings I show still another form of my fresh air intake device which may also be embodied in the original construction of the vehicle 133 or may be applied to the cowl ventilator of an existing vehicle as an adaptor device. This fresh air intake device comprises a lid member 134 and an air intake box 135 which are movable to different positions relative to the cowl opening 136 for controlling the intake of fresh air therethrough.

The lid member 134 may consist of a cover portion 136 and a deflector portion 137, and may be mounted for swinging movement by means of laterally spaced arms 138 which have pivotal connection with spaced brackets 139 on the underside of the cowl 140. In the form of my improved device here shown the box 135 is mounted on the deflector portion 137 of the lid member with the rim or open top 141 of the box in spaced or diverging relation to the cover portion 136 thereof. The top of the box as defined by the rim 141 thereof corresponds substantially in shape with the cowl opening 136 and is of a size to pass through the cowl opening when the box and lid member are swung on the hinge mounting provided by the brackets 139. The rim 141 of the box may be provided with a sealing gasket 142 of rubber or other suitable material which will engage the rim or edge 143 of the cowl opening during the swinging movement of the box.

Swinging movement may be imparted to the box 135 and the lid member 134 by suitable actuating means such as the lever 145 and the flexible rod or link 146 connecting the lever with the box. The box may be similar in construction to the boxes above referred to and may have a discharge connection 147 leading therefrom for delivery of fresh air through a conduit 148 to a heater or other desired point of use.

When the operator wishes to supply fresh air through the conduit 148 to the heater or other desired point of use, he pushes on the lever 145 to thereby elevate the lid member 134 and the box 135. The movement imparted to the lever 145 should be sufficient to bring the rim of the box, or the gasket 142 thereof, into engagement or register with the rim 143 of the cowl opening. With this setting for the box, as shown in Fig. 22, it will be seen that the lid member 134 is in a partly open position and forms an air scoop for directing fresh air into the box 135 and conduit 148 during the forward motion of the vehicle.

Figures 22, 23:
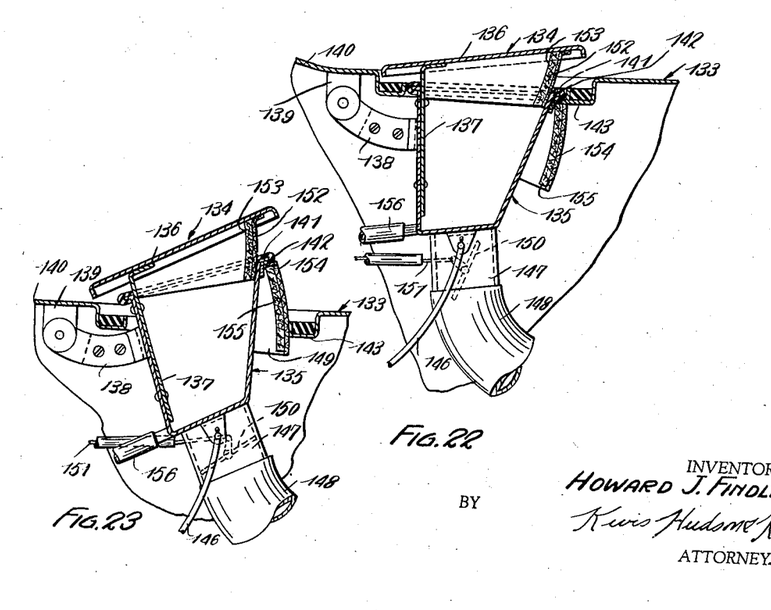
Fig. 22 is another vertical sectional view taken through the device but showing the lid partially open and the box engaging the rim of the cowl opening.
Fig. 23 is another vertical sectional view taken through the device but showing the lid fully opened and the box in an elevated position to cause air to be discharged directly into the vehicle compartment.

If the operator wishes to admit fresh air directly into the vehicle compartment without passage through the heater, he moves the lever 145 to set the box and lid member in the position shown in Fig. 23 in which the lid member 134 is in its extreme upper position and the rim 141 of the box has been moved upwardly through the cowl opening to a position some distance thereabove. For this setting of the box a portion of the wall thereof is spaced from the edge of the cowl opening to provide a space or passage 149 therebetween leading directly into the vehicle compartment. During the forward motion of the vehicle the upwardly projecting portion of the box acts as a deflector for directing air through the passage 149 into the vehicle compartment.

While the lid member and box are set in their extreme upper position, as shown in Fig. 23, it will be seen that the cover portion of the lid member will also act as an air scoop during the forward motion of the vehicle and will force air into the box 135. To enable the operator to cut off the delivery of air to the heater at this time, I may provide a valve 150 in the discharge connection 147. An actuating rod or wire 151 connected with this valve enables the operator to actuate the valve as desired and to open the same for passage of air through the conduit 148 when the box and lid member are set in the position shown in Fig. 22.

To prevent insects and other foreign particles from entering the box I may provide screen and filter elements 152 and 153 extending between the cover portion 136 and the rim of the box. Likewise, to prevent insects and foreign particles from entering the vehicle through the passage 149 I may provide another set of screen and filter elements 154 and 155 which are connected with the rim of the box and extend between the latter and the rim of the cowl opening.

If desired, a drain connection 156 may be provided adjacent the bottom of the box 135 for removing the moisture which may collect therein.

Figure 24:
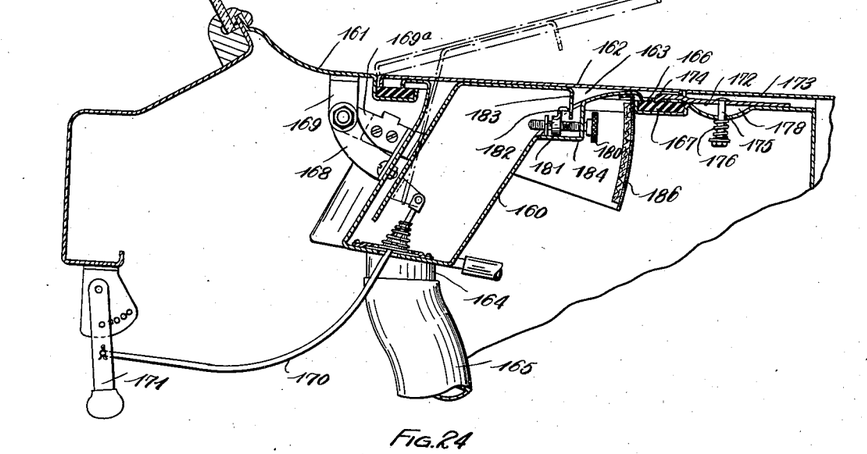
Fig. 24 is a vertical sectional view taken through another cowl ventilator and air intake arrangement of my invention.
Figure 25:
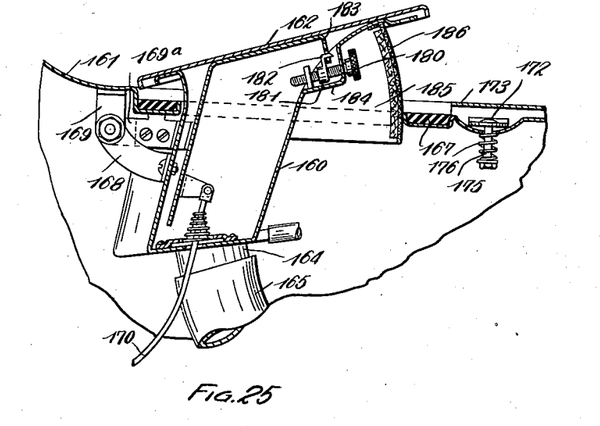
Fig. 25 is another vertical sectional view taken through the same device but showing another position for the air intake box.

In Figs. 24 and 25 I show another cowl ventilator and fresh air intake arrangement which also embodies an air intake box 160 but in which the box is adapted to be held stationary relative to the cowl 161 for one condition of vehicle operation and is adapted to be connected with the movable lid member 162 for another condition of vehicle operation. The arrangement of Figs. 24 and 25 is generally similar to that of Fig. 1, that is to say the air intake box 160 has side, ends and bottom walls and has a top opening adapted to register substantially with the cowl opening 163. The box also has a discharge connection 164, preferably at the bottom thereof, with which a flexible tube or conduit 165 may be connected for delivering fresh air to a heater or to some other desired point in the interior of the vehicle.

The box 160 extends into the cowl opening 163 and may be supported therein merely by engagement of the lateral flange or marginal rim 166 of the box with the packing 167 of the cowl structure or, if desired, may also have hinge arms 168 for pivotally mounting the same upon the same brackets 169 upon which the lid member 162 is pivotally mounted by the hinge arms 169a.

For winter driving I contemplate having the box 160 held stationary in the cowl opening in the position shown in Fig. 24 so that when the lid member 162 is moved to its broken line open position, as by means of the flexible rod 170 and actuating lever 171, fresh air will enter the box by reason of the forward motion of the vehicle and the lid member 162 acting as an air scoop, and will be delivered into the vehicle through the tube 165. Various means may be provided for holding the box 160 in this stationary position and, in this instance, I show a locking member or latch 172 which is suitable for this purpose. The latch 172 may be mounted on the cowl structure so as to be concealed by the rear end of the hood 173 and may have a hook portion or lug 174 adapted to engage in an opening provided in the forwardly projecting flange or rim 166 of the box. A bolt 175 extending through the latch 172 and the cowl structure provides a pivot and retaining means for the latch, and a compression spring 176 surrounding the bolt causes the lug 174 of the latch to remain in engagement with the rim opening of the box.

Figure 26:
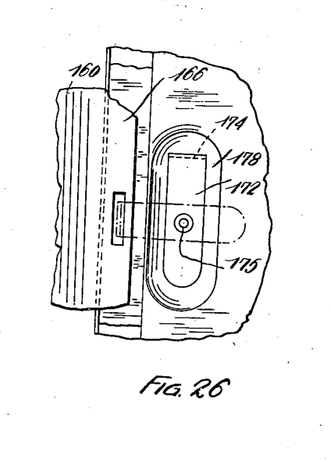
Fig. 26 is a partial plan view showing one of the box holding or locking devices.

When the weather turns warm and the operator wishes to admit fresh air into the vehicle directly through the cowl opening, the latch 172 can be disengaged so as to permit the box to be swung to an open position. To disengage the latch 172 the operator first lifts the hood 173 to afford access to the latch and then by simultaneously lifting and turning the latch he can shift the latter out of locking engagement with the rim of the box and into the transversely extending recess 178, as shown in Fig. 26.

For connecting the box 160 for movement with the lid member 162 I provide the box with a locking screw 180 by which a nut 181 can be shifted to cause the locking lug 182 thereof to engage in an opening provided in a downwardly extending flange or lip 183 of the lid member. The screw 180 may be mounted in an offset portion 184 of the front wall of the box so as to be accessible by reaching up under the cowl of the vehicle.

After the box has been disconnected from the cowl 161 by movement of the latch 172 to its transverse position as explained above, the operator moves the lid member 162 to its closed position and then reaches up under the cowl and rotates the screw 180 to cause the lug 182 to engage in the opening of the lip 183. When this engagement takes place, the box 160 becomes connected with the lid member so that lifting of the latter to the open position shown in Fig. 25 also shifts the box to an open position so that fresh air may pass directly into the vehicle through the passage 185.

If desired a screen and filtering element 186 may be mounted on the box so that when the latter is in its open position the entry of dust or other foreign particles through the passage 185 will be prevented.

In several of the air intake devices herein disclosed I have shown valves for controlling the discharge connection leading from the air intake box, but I wish it to be understood that these valves are not altogether necessary and may be omitted if desired. When it is desirable to omit these valves I prevent the delivery of fresh air to the heater by disconnecting and removing the flexible tube. When the flexible tube has been removed the discharge connection at the bottom of the box will lead directly into the vehicle compartment and the fresh air delivered therethrough will be directed toward the floor of the front compartment where additional supply of fresh air is usually desirable during warm weather.

From the foregoing description and the accompanying drawings, it will now be readily seen that I have devised an improved fresh air intake device which can be embodied in the original vehicle construction, or which can be applied as an adaptor to the cowl ventilators of existing vehicles. It will be seen furthermore, that my improved fresh air intake device provides for the control of the intake of fresh air by the movement of a lid member and an air intake box to different positions relative to the air intake opening. By thus shifting the box and lid member relative to the intake opening, it is possible to supply fresh air through a conduit to a heater or other point of the vehicle, or to supply fresh air directly into the vehicle compartment. It will also be seen from the foregoing description and drawings that I have provided novel mounting and actuating means for the movable lid member and box as well as a novel valve arrangement by which the delivery of fresh air to the heater can be cut off when the box and lid member are positioned to deliver fresh air directly into the vehicle compartment.

While I have illustrated and described the fresh air intake means of my invention in a somewhat detailed manner, it will be understood, of course, that I do not wish to be limited to the particular forms of the invention and constructional details herein disclosed but regard my invention as including such changes and modifications as do not constitute a departure from the spirit of the invention and scope of the appended claims.

Having thus described my invention, I claim:

1. In an automobile having a cowl opening and a movable lid therefor mounted on the cowl, a heater, an air intake box normally below the cowl and having an opening adapted to register substantially with the cowl opening and a tubular connection leading to the heater, means beneath the cowl mounting said box for movement to different positions relative to the cowl opening for controlling the delivery of fresh air into the automobile and the delivery of fresh air to the heater through said tubular connection, and means for opening and closing said lid and moving said box to said different positions.

2. In combination with a vehicle cowl having an opening and a movable lid for the opening mounted on the cowl and providing an air scoop adjacent said opening, an air intake box open at the top thereof and having a discharge conduit leading therefrom, means mounting said box for movement to different positions relative to the cowl opening for controlling the inflow of air through the cowl opening and through said conduit in response to forward motion of the vehicle, and means for opening and closing said lid and moving said box to said different positions.

3. In an automobile having a cowl opening and a movable lid mounted on the cowl and providing an air scoop for the opening, an air intake box depending below the cowl opening and itself having a top opening corresponding substantially in size and shape with the cowl opening, means mounting said box for movement to engage the open top thereof with the rim of the cowl opening or to disengage the same therefrom, and means for opening and closing the lid and moving said box toward or away from the cowl to either of such positions.

4. In a structure of the character described, a cowl having an opening therein, a box having a discharge connection leading therefrom and a top opening thereinto, said box being movably mounted for shifting thereof from a position with the rim of its top opening engaging the rim of the cowl opening to a position with its rim spaced from the cowl opening rim to permit the passage of air therebetween, a movable lid member adapted when in one position to form a closure for the cowl opening and when in another position to form a deflector for directing air into the cowl opening, and means for moving said lid member and box toward or away from said cowl to either of said positions.

5. An adaptor device to be applied to a cowl ventilator having a movable lid mounted on the cowl, said adaptor device comprising a box having a tubular discharge connection leading therefrom, said box having side, end and bottom walls but being open at the top thereof, means for mounting the box under the cowl ventilator including hinge means adjacent one side of the box and providing for movement thereof to locate the open top in different positions relative to the cowl for controlling the air intake through the cowl ventilator, and means for moving the lid and for moving the box to said different positions by swinging the latter toward or away from the cowl.

6. In a structure of the character described, a cowl having an opening, a movable lid member, a movable box cooperating with said member and providing for the intake of air through the cowl opening, said box having a discharge connection leading therefrom, and a valve operable for controlling said discharge connection.

7. In a structure of the character described, a cowl having an opening, a movable lid member, a movable box cooperating with said member for controlling the intake of air through the cowl opening, said box having a discharge connection leading therefrom, a valve for said discharge connection, and means for actuating said valve automatically in response to movement of the box.

8. In a structure of the character described, a cowl having an air intake opening, means controlling the intake of air through said opening comprising a movable lid member outwardly of the opening and a movable box inwardly of the opening, said box having side, end and bottom walls but being open at the top thereof, means hingedly mounting said lid member and box on the cowl at one side of said opening for swinging movement to thereby locate said lid member and the open top of the box at desired positions relative to the cowl opening, and means for imparting said swinging movement to the lid member and box.

9. In a structure of the character described, a cowl having an air intake opening, means controlling the intake of air through said opening comprising a movable lid member outwardly of the opening and a movable box inwardly of the opening, means swingably mounting said lid member and box on said cowl, and actuating means for moving said member and box including a manually operable member having direct connection with the lid and having means thereon releasably engageable with the box.

10. In a structure of the character described, a cowl having an air intake opening, a movable lid member for such opening, hinge means mounting said lid member on said cowl at one side of said intake opening for swinging toward and away from the cowl, an air intake box open at the top thereof and mounted on said lid member for movement therewith and having a tubular air discharge connection leading therefrom, the open top of said box being adapted for engagement with the underside of the cowl and of a size and shape to surround the cowl opening, and means for imparting swinging movement to said lid member and box for locating the same in desired positions relative to the intake opening of the cowl.

11. In a structure of the character described, a cowl having an air intake opening therein, a movable lid for said opening mounted on the cowl and providing an air scoop adjacent such opening, an air intake box for controlling the inflow of air through said cowl opening and itself having an opening corresponding substantially in size and shape with the cowl opening, means mounting said box for movement to engage the rim of the box opening with the rim of the cowl opening or to disengage the same therefrom, means for moving said box to either of such positions and for moving said lid toward and from a closed position, a discharge outlet for delivering air from the box, a valve controlling said discharge outlet, and means for actuating said valve automatically in response to movement of the box.

12. In a structure of the character described, a cowl having an opening therein, a box having a top opening thereinto and an outlet for delivering air from the box, said box being movably mounted for shifting thereof from a position with the rim of its top opening engaging the rim of the cowl opening to a position with its rim spaced from the cowl opening rim to permit the passage of air therebetween, a movable lid member adapted when in one position to form a closure for the cowl opening and when in another position to form a deflector for directing air into the cowl opening, means for moving said lid member and box to either of said positions, a valve controlling said delivery outlet, and means for actuating said valve automatically in response to movement of the box.

HOWARD J. FINDLEY.